US009722971B2

(12) United States Patent
Goncalves et al.

(10) Patent No.: US 9,722,971 B2
(45) Date of Patent: Aug. 1, 2017

(54) METHOD FOR ROUTING WITHIN A MOBILE TERMINAL EMULATING A CONTACTLESS PAYMENT CARD

(71) Applicant: MORPHO, Issy-les-Moulineaux (FR)

(72) Inventors: Louis-Philippe Goncalves, Issy-les-Moulineaux (FR); Sebastien Poly, Issy-les-Moulineaux (FR)

(73) Assignee: MORPHO, Issy-les Moulineaux (FR)

( * ) Notice: Subject to any disclaimer, the term of this patent is extended or adjusted under 35 U.S.C. 154(b) by 0 days.

(21) Appl. No.: 14/366,807

(22) PCT Filed: Dec. 20, 2012

(86) PCT No.: PCT/EP2012/076280
§ 371 (c)(1),
(2) Date: Oct. 6, 2014

(87) PCT Pub. No.: WO2013/092796
PCT Pub. Date: Jun. 27, 2013

(65) Prior Publication Data
US 2015/0020160 A1    Jan. 15, 2015

(30) Foreign Application Priority Data
Dec. 21, 2011   (FR) ...................... 11 62120

(51) Int. Cl.
*G06F 21/53*   (2013.01)
*H04L 29/06*   (2006.01)
(Continued)

(52) U.S. Cl.
CPC .............. *H04L 63/00* (2013.01); *G06F 21/53* (2013.01); *G06Q 20/327* (2013.01);
(Continued)

(58) Field of Classification Search
CPC ... G06Q 20/3574; G06Q 20/352; G06F 21/53
(Continued)

(56) References Cited

U.S. PATENT DOCUMENTS 8,249,654 B1 *   8/2012   Zhu ............................... 455/558
2007/0278290 A1 *  12/2007  Messerges et al. ........... 235/380
(Continued)

OTHER PUBLICATIONS

NPL_PCT_WO 2009/156880, published by World Intellectual Property Organization, 23 pagesCorda et al., Method of Accessing Application in a secure mobile environment, May 19, 2009, published by World Intellectual Property Organization, 23 pages.*
(Continued)

*Primary Examiner* — Ellen Tran
(74) *Attorney, Agent, or Firm* — Bachman & LaPointe, P.C.

(57) ABSTRACT

The present invention concerns the field of the emulation of contactless payment cards and more particularly the routing of the contactless communication within a device comprising several contactless payment card emulation circuits.

The invention proposes a method for routing messages within an NFC controller. This controller has a table of the various applications hosted by the various secure elements. When the controller receives a request for the list of applications contained in the virtual payment card, it intercepts this request and responds with the list of the various applications accessible on the various secure elements. When a request aimed at selecting an application is received, the controller stores the secure element concerned and redirects all the messages to this element as long as it does not receive any new selection request.

5 Claims, 2 Drawing Sheets

(51) Int. Cl.
G06Q 20/32 (2012.01)
G06Q 20/34 (2012.01)

(52) U.S. Cl.
CPC ..... *G06Q 20/3226* (2013.01); *G06Q 20/3227* (2013.01); *G06Q 20/3229* (2013.01); *G06Q 20/3278* (2013.01); *G06Q 20/351* (2013.01); *G06Q 20/352* (2013.01); *G06Q 20/3574* (2013.01)

(58) Field of Classification Search
USPC .............................................................. 726/3
See application file for complete search history.

(56) References Cited

U.S. PATENT DOCUMENTS

2010/0190437 A1* 7/2010 Buhot ...................... H04B 5/06
455/41.1
2011/0143663 A1 6/2011 Renard et al.

OTHER PUBLICATIONS

GSMA: Mobile NFC Technical Guidelines, Internet Citation, Dec. 2007, pp. 1-95, XP002558746, URL: http://www.gsmworld.com/documents/gsmanfc2_wp.pdf.

Gerald Madlmayr et al.: "Management of Multiple Cards in NFC-Devices", Sep. 8, 2008, Smart Card Research and Advanced Applications; [lecture notes in computer science] Springer Berlin Heidelberg, Berlin, Heidelberg, pp. 149-161, XP019104509. ISBN: 978-3-540-85892-8.

Marie Reveilhac et al.: "Promising Secure Element Alternatives for NFC Technology"; Proceedings 2009 First International Workshop on Near Field Communication—NFC 09, IEEE, Piscataway, NJ, USA, Feb. 24, 2009, pp. 75-80, XP031500082, ISBN: 978-0-7695-3577-7.

Gerald Madlmayr: "Management of Multiple Secure Elements in NFC—Devices"; Cardis 2008. Royal Holloway University of London, Jan. 1, 2008, XP055024802, pp. 7-13. URL: http://www.nfc-research.at/fileadmin/papers/2008/09/2008_09_11_cardis.pdf.

* cited by examiner

METHOD FOR ROUTING WITHIN A MOBILE TERMINAL EMULATING A CONTACTLESS PAYMENT CARD

BACKGROUND

The present invention concerns the field of the emulation of contactless payment cards and more particularly the routing of contactless communication within a device comprising several contactless payment card emulation circuits.

Bank cards that can be used for payment in shops are composed of a chip card component hosting the bank applications. This component has a high level of security and for this reason is called a secure element or SE.

When such a card is used for a payment, it is inserted into a reader of a payment terminal. A connection is established then between the payment terminal and the SE in order to make the payment. The connection is a physical connection using the physical connectors of the SE.

Contactless payment is developing. It is based on the use at the time of payment of a so-called contactless payment card that typically combines firstly the SE of a conventional payment card and a near field communication (NFC) label. The payment terminal is then equipped with an NFC label reader. The function is then the same as for a conventional payment card, the physical connection being replaced by the near field radio connection of the NFC type.

Users are more and more being equipped with mobile terminals such as mobile telephones, digital assistants or portable computers. More and more of these terminals are provided with near field radio communication interfaces. These terminals are then used to make a contactless payment. It suffices to provide these terminals with a secure element similar to that equipping contactless payment cards to enable the mobile terminal to be used in a contactless payment card emulation mode. In this contactless card emulation mode, communication between the payment terminal and the secure element is directly made via the NFC controller of the device without being controlled by the processor of the mobile terminal and the operating system thereof. This is an obligation for security reasons in particular, since a corrupted system must not be in a position to have an influence on the secure communication between the payment terminal and the secure element.

Several solutions for the implementation of secure elements are possible. The secure element may be implemented within the subscriber card or SIM (Subscriber Identity Module) card in case the mobile terminal is a mobile telephone, or a secure SIM card. It may also be implemented in the form of a component of the mother board of the mobile terminal, or within an additional board, for example an SD (Secure Digital) board. It could also be a case of a payment card, for example connected suitably to the terminal. Any one terminal may even comprise several different secure elements able to communicate with a payment terminal through the near-field radio interface.

In such a terminal there is a problem of routing the communications to the correct secure element.

SUMMARY

The invention aims to solve the above problems by means of a method for routing messages within the NFC controller. This controller has a table of the various applications hosted by the various secure elements. When the controller receives a request for the list of applications contained in the virtual payment card, it intercepts this request and responds with the list of the various applications accessible on the various secure elements. When a request aimed at selecting an application is received, the controller stores the secure element concerned and reroutes all the messages to this element as long as it does not receive a new selection request.

The invention concerns a method for routing within a mobile terminal emulating a contactless payment card and comprising a plurality of secure elements that can dialogue with a near field radio communication component, comprising the following steps: a step of reception by the radio communication component of a message coming from a payment terminal and which further comprises, if the command received is a selection command intended to receive the list of available applications: a step of forming said list from a stored table, said list containing all or some of the applications available in all the secure elements; a step of sending said list to the payment terminal in response to the selection command received and which further comprises, if the command received is an application selection command: a step of consulting said stored table in order to identify the secure element hosting the selected application; a step of storing the secure element identified as an active secure element; a step of relaying said application selection command to the active secure element and which further comprises, for all the other commands received, a step of relaying said received command to the active secure element.

According to a particular embodiment of the invention, said stored table comprising, for each application, an application identifier termed public in addition to its application identifier within the secure element, this then being termed a real identifier, the step of forming said list of applications forms said list from the public identifiers rather than from the real identifiers of the applications, and the step of relaying the command to the secure element for its part comprises a step of replacing the public identifier with the real identifier of the application prior to the relaying of the command to the active secure element.

According to a particular embodiment of the invention, it further comprises a step of updating said stored table when a change occurs in the architecture of the secure elements of the mobile terminal.

According to a particular embodiment of the invention, said updating step is performed under the control of an updating module executed on the central processor of said terminal.

According to a particular embodiment of the invention, it further comprises a step of managing the rights of access to said table by said updating module.

The invention also concerns a mobile terminal emulating a contactless payment card and comprising a plurality of secure elements able to dialogue with a near field radio communication component, comprising means for the reception, by the radio communication component, of a message coming from a payment terminal and which further comprises, if the command received is a selection command intended to receive the list of available applications: means for forming said list from a stored table, said list containing all or some of the applications available in all the secure elements; means for sending said list to the payment terminal in response to the selection command received and which further comprises, if the command received is an application selection command: means for consulting said stored table in order to identify the secure element hosting the selected application; means for storing the secure element identified as an active secure element; means for relaying said application selection command to the active secure element and which further comprises, for all the other commands received, means for relaying said received command to the active secure element.

BRIEF DESCRIPTION OF THE DRAWINGS

The features of the invention mentioned above, as well as others, will emerge more clearly from a reading of the following description of an example embodiment, the said description being given in relation to the accompanying drawings, among which.

DETAILED DESCRIPTION

Mobile terminal means in the present text any type of information processing device that can be carried by a user and that is able to host a near field radio communication interface of the NFC type. According to the herein described example of embodiment, such a terminal is a mobile telephony terminal, but it may also be a personal digital assistant, a portable computer or other.

Figure 1:
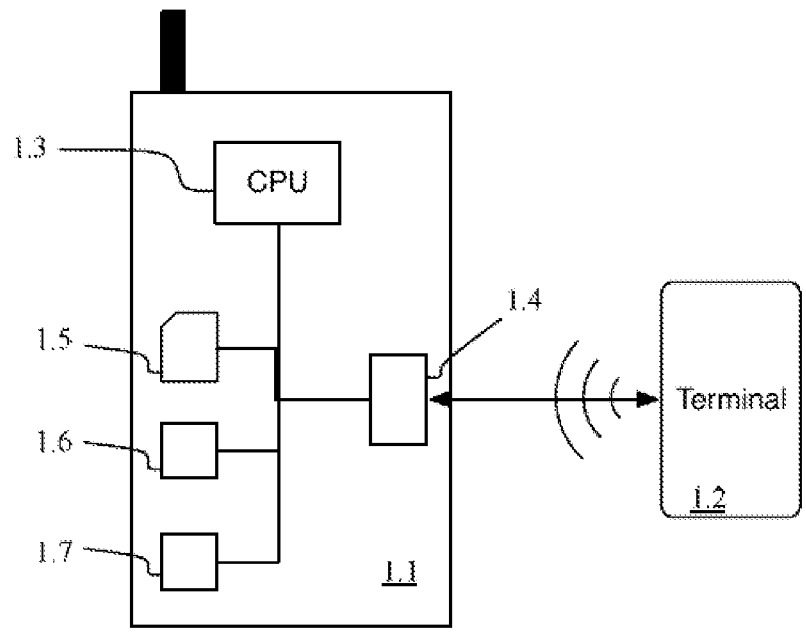
FIG. 1 illustrates the general architecture of a mobile terminal equipped with several secure elements.

The architecture of this device is illustrated in FIG. 1. The terminal 1.1 has a main processor 1.3 that enables the operating system of the terminal to function.

A secure element is defined as a component consisting of a computing memory unit. These secure elements are designed to be able to host, in a secure manner, various applications including typically banking applications. These banking applications are intended, among other things, to enable the user of the terminal to make payments by means of his terminal. Typically the secure elements also host a cryptographic processing unit used for the contents signature, ciphering and deciphering algorithms by means of digital certificates. They host the certificates enabling the user to authenticate with banking services, etc. The functioning of these secure elements is standardised and can be consulted under the reference ISO 7816.

We state here that a secure element may be implemented within the subscriber card or SIM (Subscriber Identity Module) card in the case where the terminal 1.1 is a mobile telephone, or a secure SIM card. It may also be implemented in the form of a component of the mother board of the terminal 1.1, or within an additional board, for example an SD (Secure Digital) board. It may also be a payment card suitably connected to the terminal 1.1. The terminal 1.1 may even comprise several different secure elements able to communicate with a payment terminal through a near field radio interface.

In FIG. 1, three secure elements 1.5, 1.6 and 1.7 are connected to the central processor 1.3, for example via a serial link. The central processor 1.3 can therefore interact with these secure elements 1.5, 1.6 and 1.7, and send them commands and receive the responses.

To enable the terminal 1.1 to function in a contactless payment card emulation mode, it is necessary to add an NFC near field radio communication component 1.4 to the terminal. This component 1.4 may also communicate with the central processor 1.3 by means of a bus. Typically, for a use other than contactless payment, the NFC component is controlled by an application functioning on this central processor 1.3.

On the other hand, for the functioning in emulation of a contactless payment card, in particular for security reasons, the communication between the NFC component and a secure element is direct. This communication does not pass through the central processor 1.3. Thus, even if the operating system functioning on this central processor 1.3 were to be corrupted, the functioning of the contactless payment card is not threatened. This functioning is perfect when the terminal 1.1 hosts only one secure element.

The problem addressed by the present invention is to allow routing of communications between the NFC component 1.4 and the various secure elements, in the present case, by way of example, the secure elements 1.5, 1.6 and 1.7.

Figure 2:
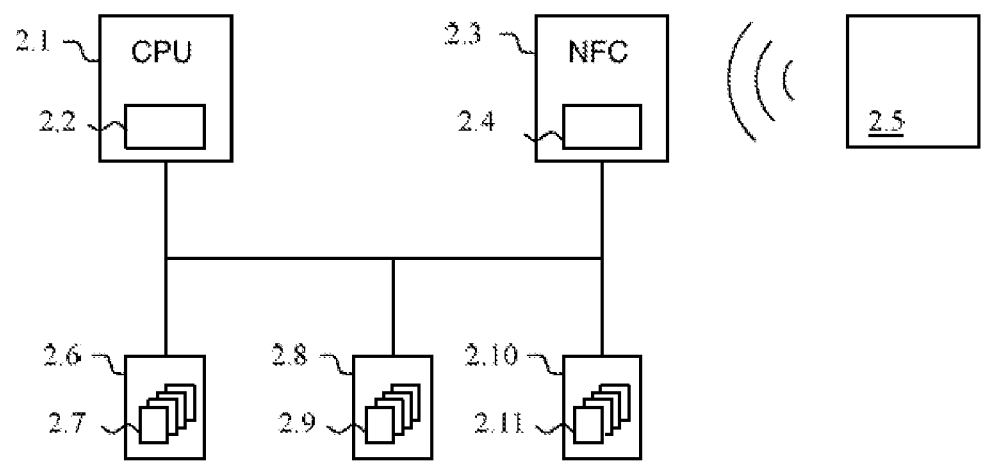
FIG. 2 details this architecture in an example embodiment of the invention.

FIG. 2 illustrates in more detail the architecture of an example embodiment. The NFC component 2.3 is again present, which affords communication with a payment terminal 2.5. The NFC component can communicate with a plurality 2.6, 2.8 and 2.10 of secure elements. The apparatus always functions under the control of an operating system running on the processor 2.1.

FIG. 2 also shows the various applications 2.7, 2.9 and 2.11 hosted by each of the secure elements 2.6, 2.8 and 2.10. The invention is essentially implemented within the NFC component 2.3 in the form of a routing module 2.4. According to certain particular embodiments of the invention, a module 2.2 for managing a table of the available applications can be used. This module then functions on the central processor 2.1 of the mobile terminal 1.1. Its function will be detailed later.

Figure 3:
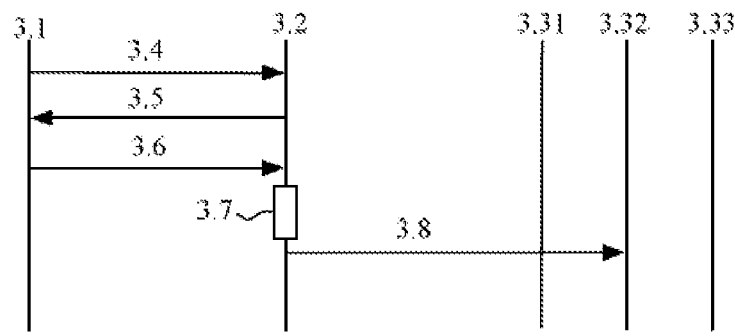
FIG. 3 illustrates the exchanges between the various components of the system during an application selection.

FIG. 3 illustrates the exchanges between the various components of the system during an application selection.

The conventional function of a contactless payment card is as follows. When the card enters into the field of a reader equipping a payment terminal, low-level protocol exchanges take place in order to initialise the connection. These exchanges are not described in detail here. Next, the payment terminal sends a first selection command called "SELECT PPSE", the purpose of which is to request, from the card, the list of applications present within it. The card responds to this request by means of a list of available applications and, for each application, gives an application identifier known by the term AID (Application IDentifier). The terminal chooses one of these applications in the list and selects it by means of a command "SELECT AID". All the following exchanges then take place between the terminal and the application selected as long as a new selection command is not sent by the payment terminal.

In the context of the mobile terminal emulating a payment card, we have a plurality of secure elements, each of these secure elements corresponding to a contactless payment card.

The payment terminal is represented by the line 3.1 in FIG. 3. The line 3.2 represents the NFC component of the mobile terminal, while the lines 3.31, 3.32 and 3.33 represent the various secure elements hosted in the mobile terminal.

When the terminal sends a command "SELECT PPSE" 3.4 aimed at requesting the list of available banking applications, this request is received firstly by the NFC component 2.3. This request is then filtered and recognised as such by an ad hoc module, referred to as a routing module and referenced 2.4 in FIG. 2. The first innovative aspect of the invention consists of this interception and of the fact that the routing module intercepts the command "SELECT PPSE" in order to respond thereto instead of one of the secure elements.

The routing module therefore responds to the request by sending 3.5 a table of the applications available on all the secure elements. This table may be formed in various ways. It may be configured at the time of initialisation of the terminal or fixed by the operator or by the bank of which the user is a customer. Any means for forming the table is permissible. There may also be an initial step where the routing module itself sends a command "SELECT PPSE" to each of the secure elements, receives the responses sent by each of the secure elements and then itself forms a table resulting from a concatenation of the lists received in response. According to some embodiments, the table stored in the routing module and sent in response to the command "SELECT PPSE" sent by the payment terminal may not contain all the applications available on the various secure elements. This flexibility optionally makes it possible to manage various subscriptions or be done for any other reason. The table therefore contains a subset containing all or some of the set of applications available on all the secure elements. The table may also be stored by the routing module within any storage space available in the terminal and the location thereof is not limited to the NFC component itself.

The table also contains, for each application, an identifier of the secure element that hosts it. In this way, when the routing module receives the command 3.6 "SELECT AID", it can find the secure element that hosts the selected application. It then stores the secure element as being the active secure element during step 3.7.

It then sends the application selection request "SELECT AID" 3.8 to the secure element concerned, in this case the secure element 3.32 in FIG. 3. All the subsequent traffic coming from the payment terminal is then routed to the active secure element. Switching to a new active secure element occurs at the time of the reception by the routing module of a new command "SELECT AID" questioning the current active secure element.

Figure 4:
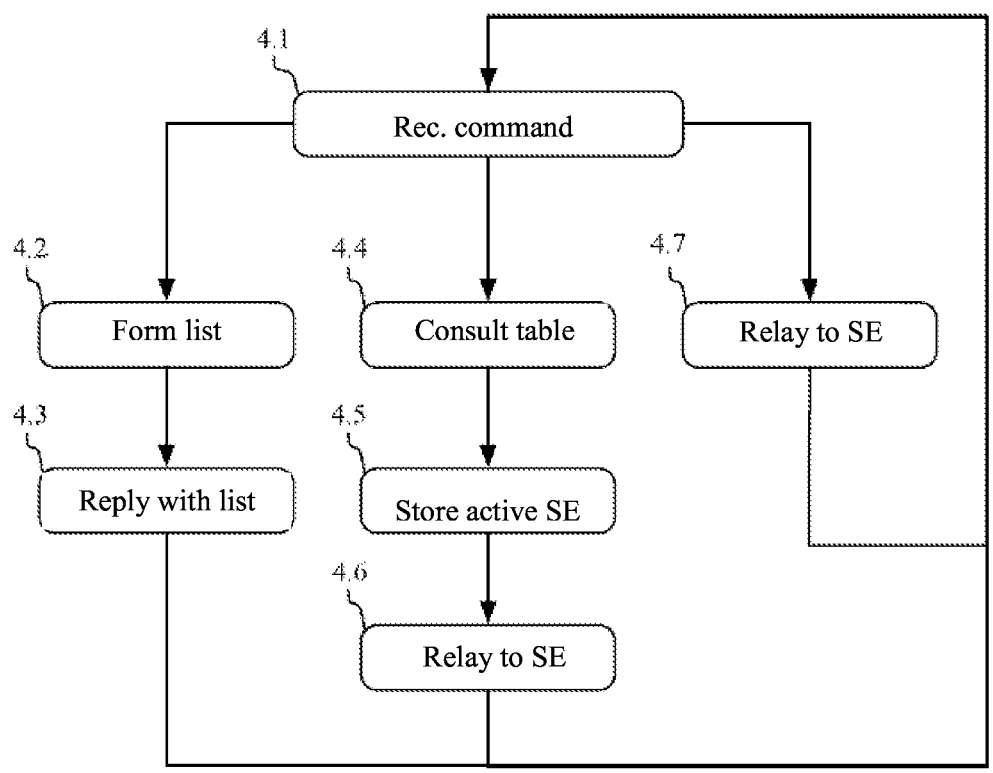
FIG. 4 illustrates the operating flow diagram of the routing module within the NFC controller in an example embodiment of the invention.

According to the example embodiment of the invention, the routing module functions according to the flow diagram in FIG. 4.

During step 4.1, the module receives a command sent by the payment terminal via the NFC connection. This command is then filtered and processed according to its nature. Three cases can be distinguished.

In the first case, the command received is a command "SELECT PPSE" intended to obtain the list of applications available within the contactless payment card emulated by the mobile terminal. Step 4.2 of forming the list of applications from the stored table is then passed to, this list containing all or some of the applications available in all the secure elements. Once this list is constructed, it is sent, in response to the command "SELECT PPSE", to the payment terminal during a step 4.3.

In the second case, the command received is a command "SELECT AID". During a first step 4.4, the routing module consults the stored table in order to find the secure element that is hosting the application, the identifier of which is made a parameter of the selection command. Once this secure element is identified, the routing module stores this new secure element as the current active secure element, during step 4.5. The selection command is then relayed to the active secure element during step 4.6. In this way firstly the identity is stored of the secure element to which the received selection command and therefore the following commands relate, and secondly this command is transmitted for effective selection of the required application within the secure element.

Any other command is treated in accordance with step 4.7, which merely relays the command to the active secure element. Advantageously, an active secure element is stored by default when the terminal is switched on.

It may happen that the same application is present in at least two secure elements. There are then two applications having the same identifier and located in two different secure elements.

Advantageously, the stored table associates with each application an identifier, termed the public identifier, which may be different from the real identifier of the application in the secure element. According to this embodiment, the step of forming the list of applications 4.2 forms said list from the public identifiers rather than from the real identifiers of the applications. The step 4.6 of relaying the command to the secure element for its part comprises a step of replacing the public identifier with the real identifier of the application prior to the relaying of the command to the active secure element. In this way, it is possible to disclose applications having the same identifier hosted in two different secure elements.

Advantageously, the table is updated when a modification occurs in the architecture of the secure elements of the mobile terminal, for example when a new SIM card or a new SD card containing a secure element is inserted. The updating is then controlled by a module for updating the table, the module 2.2 being executed on the processor of the terminal.

Advantageously, this table is protected by means of access rights. Thus only the operator or the bank may modify the table. Access to a given application or even to a given secure element can then be dependent on commercial considerations and not be automatic. The access rights are then advantageously managed by said module for updating the table.

The invention claimed is:

1. A routing method carried out by a mobile terminal intended to emulate a contactless payment card and comprising a near field radio communication component and a plurality of secure elements, each of said secure elements hosting applications, each application enabling said mobile terminal to communicate by means of the near field radio communication component with a payment terminal, said method being provided to route messages received from said payment terminal to a particular application stored in a particular secure element, said application being chosen by said payment terminal, comprising an initializing step of constituting a stored table in which are stored all the applications available on said mobile terminal and, for each of them, an identification of the secure element hosting said application, wherein said method performs under reception of, a message coming from a payment terminal;
if the received message is a selection command intended for the payment terminal to receive the list of available applications on said mobile terminal:
a step of forming said list of applications from said table, and;
a step of sending said list to the payment terminal;
if the message is an application selection command issued by said payment terminal for selecting a particular application:
a step of determining, by consulting said stored table the secure element in which said particular application is hosted;

a step of activating the secure element so determined; and a step of relaying said application selection command to the activated secure element;

said method for all the other messages received, further comprising a step of relaying said received message to the activated secure element, and wherein said stored table comprises, for each application, an application identifier, termed public application identifier, in addition to its application identifier within the secure element in which it is hosted, this then being termed a real identifier, each public application identifier in the stored table being different and identifying uniquely one of the applications hosted by one of the secure elements:

the step of forming said list of applications forms said list from the public identifiers rather than from the real identifiers of the applications;

wherein, the step of relaying the received message to the activated element for its part comprises a step of replacing the public application identifier of the application with the real application identifier of the application prior to relaying the message to the activated secure element.

2. The method according to claim 1, further comprising:

a step of updating said stored table when a modification occurs in the architecture of the secure elements of the mobile terminal.

3. The method according to claim 2, wherein said updating step is performed under the control of an updating module executed on the central processor of said terminal.

4. The method according to claim 3, further comprising managing the rights of access to said table by said updating module.

5. A mobile terminal emulating a contactless payment card and comprising a plurality of secure elements able to dialogue with a near field radio communication component, comprising means for the reception, by the radio communication component, of a message coming from a payment terminal; further comprising:

means for forming said list from a stored table, when a selection command intended to receive the list of available applications is received, said list containing all or some of the applications available in all the secure elements; and means for sending said list to the payment terminal in response to the selection command received;

means for consulting said stored table, when an application selection command is received, in order to identify the secure element hosting the selected application;

means for storing the secure element identified as an active secure element; and means for relaying said application selection command to the active secure element;

and means for relaying any other received command to the active secure element, and wherein, said stored table comprising, for each application, an application identifier, termed public application identifier, in addition to its application identifier within the secure element in which it is hosted, this then being termed a real identifier, each public application identifier in the stored table being different and identifying uniquely one of the applications hosted by one of the secure elements:

the means for forming said list of applications forms said list from the public identifiers rather than from the real identifiers of the applications;

wherein:

the means for relaying the received message to the activated secure element for its part comprises means for replacing the public application identifier of the application with the real application identifier of the application prior to relaying the message to the activated secure element.

* * * * *